United States Patent
Kertesz

(10) Patent No.: US 6,494,497 B1
(45) Date of Patent: Dec. 17, 2002

(54) FLUID-TIGHT FLUID CONDUIT

(75) Inventor: Janos Kertesz, Hofheim (DE)

(73) Assignee: Rasmussen GmbH, Maintal (DE)

( * ) Notice: Subject to any disclaimer, the term of this patent is extended or adjusted under 35 U.S.C. 154(b) by 52 days.

(21) Appl. No.: 09/709,121

(22) Filed: Nov. 8, 2000

(30) Foreign Application Priority Data

Nov. 30, 1999 (DE) .......................... 199 57 567

(51) Int. Cl.⁷ .......................... F16L 9/147; F16L 33/01
(52) U.S. Cl. .................. 285/226; 285/222.1; 285/222.2; 285/222.3; 285/903
(58) Field of Search .................. 285/226, 903, 285/222.1–222.4, 21.1, 21.3, 915, 242, 294.1, 293.1, 223; 138/121, 122

(56) References Cited

U.S. PATENT DOCUMENTS

| | | | | |
|---|---|---|---|---|
| 311,178 A | * | 1/1885 | Duffy | 285/226 |
| 1,365,306 A | * | 1/1921 | Dickinson | 285/222.2 |
| 3,627,354 A | * | 12/1971 | Toepper | 285/55 |
| 4,293,150 A | * | 10/1981 | Press | 285/149 |
| 5,538,294 A | | 7/1996 | Thomas | |
| 5,553,893 A | * | 9/1996 | Foti | 285/168 |
| 5,960,977 A | | 10/1999 | Ostrander et al. | |
| 5,984,375 A | * | 11/1999 | Merrett | 285/253 |
| 6,019,399 A | * | 2/2000 | Sweeney | 285/248 |

FOREIGN PATENT DOCUMENTS

| | | |
|---|---|---|
| DE | 1400523 | 10/1968 |
| DE | 1514208 | 6/1978 |
| DE | 4238605 | 5/1994 |
| DE | 4315175 | 11/1994 |
| EP | 0676575 | 10/1995 |

* cited by examiner

Primary Examiner—Lynne H. Browne
Assistant Examiner—Giovanna Collins
(74) Attorney, Agent, or Firm—Friedrich Kueffner

(57) ABSTRACT

A diffusion-tight fluid conduit for hydrocarbon-containing fluids has a corrugated pipe of corrosion-resistant metal with a corrugated inner side and a corrugated outer side, wherein the outer side is exposed. An inner pipe of plastic material is arranged inside the corrugated pipe and has a smooth inner side and a smooth outer side. A first coupling member is seal-tightly connected by material bonding to a first end of the corrugated pipe.

15 Claims, 1 Drawing Sheet

FLUID-TIGHT FLUID CONDUIT

BACKGROUND OF THE INVENTION

1. Field of the Invention

The invention relates to a diffusion-tight fluid conduit for hydrocarbon-containing fluids, in particular, fuels.

2. Description of the Related Art

Such fluid conduits are used primarily in the automotive industry. Especially in this field, ever higher requirements with regard to leakage of hydrocarbons, such as liquid fuels or brake fluid, be it as a result of defects, leaks, or diffusion to the exterior, as well as mechanical strength, corrosion resistance, heat resistance, fire resistance, and flexibility are posed.

In order to be able to fulfill as many of these requirements as possible, several solutions are known in practice as well as in the literature. Substantially, the fluid conduits, be they of a smooth or corrugated shape, are comprised of plastic pipes of most different materials, which are either reusable and/or can be decomposed naturally, of different layers of different materials and material mixtures, wherein one layer can also be of metal in order to achieve a-diffusion tightness or barrier with regard to diffusion as high as possible. Moreover, it is known to provide most different types of pipes of predetermined lengths at their ends with attached coupling members in order to connect them to a correspondingly matched coupling part connected to devices, pipes or hose.

These known solutions are generally complicated, difficult to manufacture and often still do not fulfill, or only partly fulfill, the requirements of the automotive industry.

From the U.S. Pat. No. 5,538,294 a substantially diffusion-tight fluid conduit is known which is in the form of a corrugated pipe of metal, which is corrugated at the inner and outer sides and exposed at the outer side, and two coupling members of metal which are connected by flanges or a screw connection to the ends of the corrugated pipe. Such a purely positive-locking connection is not sufficiently tight, especially not sufficiently diffusion-tight. The degree of corrosion resistance of the metal is not disclosed in this patent document. A corrugated pipe which is exposed to the fluid with its corrugated inner side increases the flow resistance and entails the risk that, after installation, particles contained in the fluid and/or liquid, such as condensed water or diesel fuel which can freeze at lower temperatures, will collect in the inner corrugation valleys of the corrugated pipe positioned at the bottom.

SUMMARY OF THE INVENTION

It is an object of the present invention to provide a fluid conduit for hydrocarbons, especially fuels, which makes it possible to fulfill to a very high degree most of the requirements posed by the automotive industry.

In accordance with the present invention, this is achieved in that the fluid conduit comprises a corrugated pipe of corrosion-resistant metal which is corrugated at its inner side and its outer side and is exposed at its outer side, a first coupling member connected to one end of the corrugated pipe by a material-bonding connection or additionally by a positive-locking connection so as to be seal-tight, and an inner pipe of plastic arranged within the corrugated pipe and having outer and inner smooth sides.

Material-bonding connections include, for example, fusing, welding, connections using adhesives, bonding agents etc., as is well known to a person skilled in the art.

Such a fluid conduit fulfills to a very high degree practically all of the requirements posed by the automotive industry. For example, the corrugated pipe is at least over its entire length completely diffusion-tight but also of high mechanical -strength, fire resistance, heat resistance, impact resistance, flexibility, and corrosion resistance. Since it is comprised of metal, it cannot be electrically charged by friction. Because of its high flexibility and the coupling member provided at least at one end, the fluid conduit can also be easily installed with different degrees of curvature and can be quickly connected by means of its coupling member to a matching coupling member, provided at a pipe socket of a device or the end of another fluid conduit, without the first coupling member having to be connected at the installation site with the corrugated pipe. When the first coupling member is also positive-lockingly connected to the corrugated pipe, the connection is especially strong. The smooth inner pipe of plastic material provides a corrugated pipe of a fluid conduit having corrugations at its inner and outer side with a smooth surface at its inner side which reduces the flow resistance in the fluid conduit and prevents the collection of particles and liquid in the lower corrugation valleys at the inner side of the corrugated pipe.

The first coupling member can also be comprised of corrosion-resistant metal. As an alternative, it can be comprised of a thermoplastic material.

Producing the coupling member of metal has the advantage that then the coupling member has an especially high diffusion tightness. On the other hand, thermoplastic material can be easily produced in the desired shape and can also be relatively diffusion-tight.

The metal of which the corrugated pipe or the first coupling member is comprised, can be stainless steel. This material is especially corrosion-resistant.

Preferably, it is provided that a second coupling member of corrosion-resistant metal, especially stainless steel, or thermoplastic material is connected to the other end of the corrugated pipe by a material-bonding connection or, additionally, by a positive-locking connection. In this embodiment, the two ends of the fluid conduit can be connected quickly with a corresponding coupling member of a pipe socket, a hose, or another pipe without having to connect the second coupling member with the corrugated pipe at the installation site.

The first coupling member or both coupling members can have a radial member surface which is connected with a radial pipe surface at the corresponding end of the corrugated pipe by a material-bonding connection. Such a connection is especially tight. When the coupling member or both coupling members are comprised of metal, they can be connected, for example, by welding to the corrugated pipe which is comprised of metal. However, it is also possible to connect the corrugated pipe with the coupling member or both coupling members by means of an adhesive. When one or both coupling members are comprised of thermoplastic material, they can also be connected to the corrugated pipe by means of a bonding agent between the radial surfaces in a seal-tight way.

Moreover, it can be ensured that the corrugated pipe has at each end connected to a coupling member a radially outwardly extending projection which, together with an end portion of the corrugated pipe and a portion of the coupling member adjacent to the end portion of the corrugated pipe, is embedded in a plastic ring by injection molding. This plastic ring can be provided alone or in addition to the described material-bonding connections and, in addition, makes possible a positive-locking connection by means of the projection which is embedded simultaneously when the end portion of the corrugated pipe is embedded by injection molding and, in this way, is positive-lockingly embedded in the thermoplastic material of the plastic ring.

The projection can be formed as a partial or complete circumferential flange. In the latter case a greater contact surface between the plastic ring and the flange results with a correspondingly higher sealing action.

When the plastic ring and the corrugated pipe are not connected by a material-bonding connection by means of a bonding agent, a sealing ring can be arranged between the plastic ring and the corrugated pipe.

Also, between the plastic ring and the coupling member or coupling members a sealing ring can be arranged when the plastic ring is not connected by a material-bonding connection to the coupling member or coupling members.

The inner pipe can have primarily a flexible thermoplastic material or a cross-linked rubber elastomer. Accordingly, the flexibility of the fluid line is not impaired by the addition of the inner pipe.

The plastic material of the inner pipe can also be mixed with electrically conducting particles, especially carbon black, in order to prevent a static electrical charge of the inner pipe by friction between the inner pipe and the fluid flowing therethrough.

Moreover, it can be ensured that an end portion of the coupling member or coupling members connected to the corrugated pipe is pressed into an end portion of the inner pipe. In this way, a relatively tight and strong connection results between the inner pipe and the coupling member.

When in this connection the end portion of the coupling member or coupling members is ribbed, the connection between the coupling member and the inner pipe provides a type of labyrinth seal since the material of the inner pipe can engage between the ribs of the ribbed end portion. In addition, this type of connection functions as a positive-locking connection.

Instead of plastic material, the inner pipe can also be comprised of a thin, flexible metal. This increases additionally the diffusion tightness without impairing the flexibility.

When the corrugated pipe has corrugations at its inner side and its outer side, it is especially flexible.

Moreover, the corrugated pipe can have smooth and corrugated portions. In this way, the fluid conduit can be produced with less material when it is clear from the beginning which portions of the fluid conduit must not be bent during installation. These portions can then be smooth, i.e., not corrugated.

DESCRIPTION OF THE PREFERRED EMBODIMENTS

The illustrated fluid conduits are used primarily in motor vehicles, especially for hydrocarbon-containing fluids, such as fuels and brake fluid. However, they can also be used for glycol-containing cooling water or combustible gases. For this purpose, they must also be especially tight with respect to diffusion of such liquids and gases.

Figure 1:
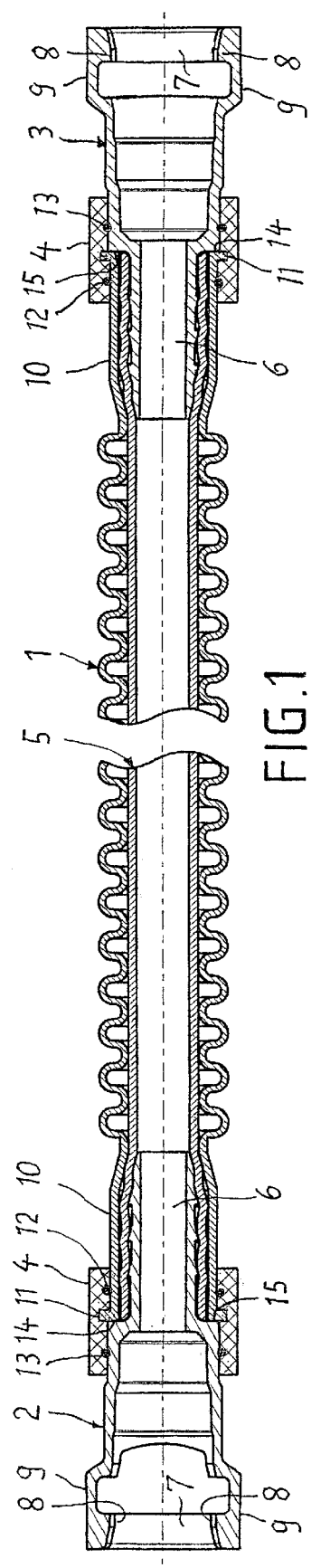
FIG. 1 is an axial section of a first embodiment of the fluid conduit according to the invention.

The fluid conduit according to FIG. 1 is comprised of a corrugated pipe 1 of corrosion-resistant metal, in this case stainless steel, a first coupling member 2 of thermoplastic material connected to one end of the corrugated pipe 1 by a material-bonding or additionally positive-locking connection in a seal-tight manner, a second coupling member 3 of g thermoplastic material connected to the other end of the corrugated pipe 1 by a material-bonding or additionally positive-locking connection in a seal-tight manner, two plastic rings 4, and an inner pipe 5 with smooth inner and outer sides which is comprised primarily of thermoplastic material or a cross-linked rubber-elastomer.

The coupling members 2 and 3 have an outer Christmas tree-shaped ribbed end portion 6. Each end portion 6 is pressed into a respective end portion of the inner pipe 5 in the axial direction so that the coupling members 2 and 3 are connected by a frictional connection and a positive-locking connection with the inner pipe 5. Into the free end portions of the coupling parts 2 and 3 a corresponding coupling member can be inserted so that the inserted coupling members are locked with one another by locking noses 8 projecting radially inwardly from a flexible oval ring 7 and engaging behind a circumferentially extending securing rib of the inserted coupling member. The ring 7 is connected by elastic stays 9 with the other parts of the coupling members.

The corrugated pipe 1 has smooth, i.e., un-corrugated, end portions 10 and is provided at its free ends with a radially outwardly extending projection 11, respectively. In this embodiment the projection 10 is in the form of a circumferential flange which is embedded in a plastic ring 4 produced by injection molding. The material of the plastic ring 4 is selected such that it fuses with the plastic material of the coupling members 2 and 3 during injection molding. It can also be connected with the metal of the corrugated pipe 1 by a material-bonding connection by employing a bonding agent. This material-bonding connection of the plastic ring 4 and the corrugated pipe 1 can however be eliminated when instead a sealing ring 12 is provided between the plastic ring 4 and the corrugated pipe 1. As an alternative, the coupling members 2 and 3 can be comprised of a corrosion-resistant metal, preferably stainless steel. Optionally, the plastic ring 4 can be connected with the corresponding coupling member 2 or 3 with interposition of a bonding agent wherein, additionally, a sealing ring 13 may then be arranged between the plastic ring 4 and the corresponding coupling member 2 or 3.

As an alternative or in addition, the radial pipe surface 14 at each end of the corrugated pipe 1 can be connected by a material-bonding connection with the radial member surface 15 of the coupling members 2 and 3. When the coupling members 2 and 3 are comprised of metal, the radial surfaces 14 and 15 can be welded. When the coupling members 2 and 3 are instead comprised of thermoplastic material, the radial surfaces 14 and 15 can be connected by interposition of a bonding agent.

The inner pipe 5 can contain in addition to the bendable or flexible thermoplastic material or cross-linked rubber elastomer electrically conducting particles, especially carbon black.

As an alternative, the inner pipe 5 can also be comprised of a thin, flexible metal.

The corrugated pipe 1 is corrugated at the inner side and the outer side. Moreover, it can have additional smooth portions which are not illustrated.

Because of the flexibility of the corrugated pipe 1 as well as of the inner pipe 5, the fluid conduit can be installed in any desired curved shape. The embodiment with smooth portions would be selected when it is known from the beginning which portions are not to be curved during the installation of the fluid conduit. These portions would then be formed without corrugations.

Since the corrugated pipe 1 is comprised of metal, it is practically absolutely diffusion-tight. This holds true also for the coupling members 2 and 3 made of metal. When they are connected by welding to the corrugated pipe 1, the fluid conduit is practically completely diffusion-tight over its entire length. However, when the coupling members 2 and 3 are comprised of plastic material, they would not be completely diffusion-tight, but the length across which the fluid conduit would not be completely diffusion-tight would be relatively short. Moreover, the plastic material used possibly for the-manufacture of the coupling members 2 and 3 could also be substantially diffusion-tight. Also, the installation of the fluid conduit can be performed relatively easily because the coupling members 2 and 3 are already connected by the manufacturer with the corrugated pipe 1 and the inner pipe 5 and must only be inserted into the matching coupling members.

Figure 2:
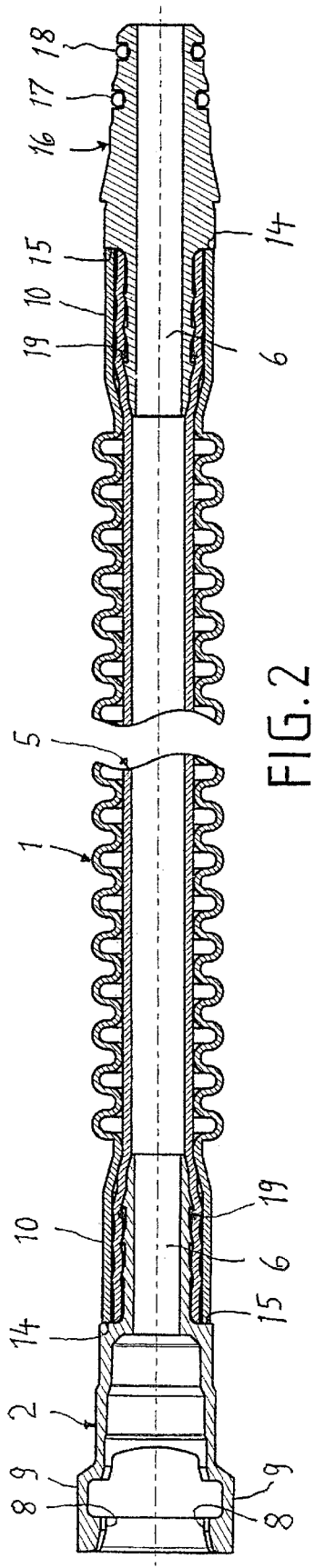
FIG. 2 is an axial section of a second embodiment of the fluid conduit according to the invention.

The fluid conduit according to FIG. 2 differs from that of FIG. 1 in principle only in that the plastic ring 4 and the sealing rings 12 and 13 as well as the projections 11 are eliminated. Moreover, instead of the receiving coupling member 3 provided in the fluid conduit according to FIG. 1 a plug-in coupling member 16 is provided which can be inserted into one of the coupling members 2 and 3 of the fluid conduit according to FIG. 1. For sealing the plug-in connection, the coupling member 16 is provided with sealing rings 17 and 18.

The coupling members 2 and 16 according to FIG. 2 are comprised of metal. At least the corrugated pipe 1 is comprised also of metal and is welded with the radial pipe surfaces 14 provided at its ends with the radial member surfaces 15 of the plug-in coupling members 2 and 16. In addition, sealing rings 19 are provided between the end portions 6 of the coupling members 2 and 16 and the inner pipe 5. These sealing rings 19 in the form of O-rings can also be provided in the fluid conduit according to FIG. 1.

The inner pipe 5 reduces the flow resistance but does also prevent that particles and/or liquid will collect in the inner corrugation valleys which are positioned at the bottom after installation of the fluid conduit wherein the liquid, for example, in the case of condensation water or diesel fuel, may be at risk of freezing.

A further embodiment of the fluid conduits illustrated in FIGS. 1 to 2 can reside in that the coupling member is eliminated at one end, for example, when it is not clear from the beginning with which type of coupling member, a receiving coupling member or a plug-in coupling member, this end is to be connected.

While specific embodiments of the invention have been shown and described in detail to illustrate the inventive principles, it will be understood that the invention may be embodied otherwise without departing from such principles.

What is claimed is:

1. A diffusion-tight fluid conduit for hydrocarbon-containing fluids, the fluid conduit comprising:

a corrugated pipe of corrosion-resistant metal having an inner side and an outer side, wherein the outer side is exposed;

an inner pipe comprising plastic material arranged inside the corrugated pipe and having a smooth inner side and a smooth outer side;

a first coupling member of thermoplastic material seal-tightly connected to a first end of the corrugated pipe; and a plastic ring injection-molded about the first end of the corrugated pipe and about a section of the first coupling member adjacent the first end of the corrugated pipe, such that the plastic ring is positive-lockingly connected to the first end of the corrugated pipe and the plastic ring and the first coupling member are connected by a fused material-bonding connection.

2. The fluid conduit according to claim 1, wherein the corrosion-resistant metal is stainless steel.

3. The fluid conduit according to claim 1, further comprising a second coupling member of thermoplastic material seal-tightly connected to a second end of the corrugated pipe.

4. The fluid conduit according to claim 3, wherein the second coupling member is positive-lockingly connected to the second end of the corrugated pipe.

5. The fluid conduit according to claim 3, wherein the first coupling member has a radial member surface and wherein the first end has a radial pipe surface, wherein the radial member surface and the radial pipe surface rest against one another and are connected by material bonding.

6. The fluid conduit according to claim 3, wherein the first end of the corrugated pipe has a radially outwardly extending projection, wherein the plastic ring is injection-molded about the radially outwardly extending projection.

7. The fluid conduit according to claim 6, comprising a sealing ring arranged between the plastic ring and the corrugated pipe.

8. The fluid conduit according to claim 3, wherein an end portion of the first coupling member is pressed into the inner pipe.

9. The fluid conduit according to claim 8, wherein the end portion of the first coupling member is ribbed.

10. The fluid conduit according to claim 1, wherein the inner pipe is comprised primarily of a pipe material selected from the group consisting of a flexible thermoplastic material and a cross-linked rubber elastomer.

11. The fluid conduit according to claim 10, wherein the pipe material contains electrically conducting particles.

12. The fluid conduit according to claim 11, wherein the electrically conducting particles are active carbon particles.

13. The fluid conduit according to claim 1, wherein the corrugated pipe is comprised of smooth sections and corrugated sections.

14. The fluid conduit according to claim 1, wherein the corrugated pipe has a corrugated inner side and a corrugated outer side.

15. The fluid conduit according to claim 1, wherein the corrugated pipe has a smooth inner side.

* * * * *